United States Patent
Muto et al.

(10) Patent No.: US 11,126,582 B2
(45) Date of Patent: Sep. 21, 2021

(54) CIRCUIT DEVICE, DETERMINATION METHOD FOR CIRCUIT DEVICE, AND ELECTRONIC APPARATUS

(71) Applicant: Seiko Epson Corporation, Tokyo (JP)

(72) Inventors: Kota Muto, Matsumoto (JP); Toshimichi Yamada, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/851,250

(22) Filed: Apr. 17, 2020

(65) Prior Publication Data
US 2020/0334188 A1  Oct. 22, 2020

(30) Foreign Application Priority Data

Apr. 18, 2019 (JP) .............................. JP2019-079039

(51) Int. Cl.
*G06F 13/40* (2006.01)
*G06F 13/38* (2006.01)
*G06F 13/42* (2006.01)
*H04L 25/02* (2006.01)

(52) U.S. Cl.
CPC ........ *G06F 13/4081* (2013.01); *G06F 13/385* (2013.01); *G06F 13/4221* (2013.01); *H04L 25/028* (2013.01); *H04L 25/0272* (2013.01); *H04L 25/0292* (2013.01); *G06F 2213/0042* (2013.01)

(58) Field of Classification Search
CPC .... G06F 13/408; G06F 13/385; G06F 13/422; G06F 2213/0042; H04L 25/028; H04L 25/0292; H04L 25/0272
See application file for complete search history.

(56) References Cited

U.S. PATENT DOCUMENTS

| | | | | |
|---|---|---|---|---|
| 9,483,435 B2* | 11/2016 | Dixit | .................. | G06F 1/266 |
| 10,581,622 B2* | 3/2020 | Fujiwara | .................. | H04L 12/42 |
| 2001/0017846 A1* | 8/2001 | Wu | .................. | G06F 13/4086 370/257 |
| 2005/0057280 A1 | 3/2005 | Groen et al. | | |
| 2007/0030035 A1* | 2/2007 | Komatsu | .................. | H04L 25/0272 327/65 |
| 2011/0148470 A1 | 6/2011 | Inoue | | |
| 2018/0212796 A1* | 7/2018 | Kamihara | .................. | G06F 11/00 |
| 2020/0014353 A1* | 1/2020 | Kan | .................. | H03G 3/3073 |
| 2020/0311007 A1* | 10/2020 | Muto | .................. | H03K 19/0175 |

FOREIGN PATENT DOCUMENTS

JP     2007-505575 A    3/2007
JP     2011-129042 A    6/2011

* cited by examiner

*Primary Examiner* — Nimesh G Patel
(74) *Attorney, Agent, or Firm* — Harness, Dickey & Pierce, P.L.C.

(57) ABSTRACT

A circuit device includes a packet output circuit configured to amplify a current for a packet and output the packet to a USB-compliant bus, a detection circuit configured to detect whether an amplitude level of the packet transmitted to the bus has exceeded a disconnection detection level for a prescribed time period, a determination circuit configured to set a current for an EOP of an SOF packet output by the packet output circuit to lower than a current for a section other than the EOP, and when it is detected, by the detection circuit, that an amplitude level of the EOP has exceeded the disconnection detection level, determine that a device that was connected to the bus is disconnected.

5 Claims, 7 Drawing Sheets

FIG. 18B

CIRCUIT DEVICE, DETERMINATION METHOD FOR CIRCUIT DEVICE, AND ELECTRONIC APPARATUS

The present application is based on, and claims priority from JP Application Serial Number 2019-079039, filed Apr. 18, 2019, the disclosure of which is hereby incorporated by reference herein in its entirety.

BACKGROUND

1. Technical Field

The present disclosure relates to a circuit device, a determination method for a circuit device, and an electronic apparatus, for example.

2. Related Art

When transmitting/receiving signals such as packets in compliance with the USB (Universal Serial Bus) standard, a measure such as increasing an amplitude level of the signals in advance on a transmission side is taken in some cases in consideration of attenuation. However, when the amplitude level exceeds a disconnection detection level, it is determined that a communication partner device is disconnected despite the partner device being connected.

In view of this, a technique is proposed in which the disconnection detection level is increased when the amplitude level is increased (e.g. JP-A-2011-129042).

However, in the above-described technique, there is a problem in that a configuration for changing the disconnection detection level, specifically, a configuration for generating a plurality of reference voltages and selecting one of the reference voltages, is also separately required, and thus the configuration tends to be complicated.

SUMMARY

In order to solve the above-mentioned problem, a circuit device according to an aspect of the disclosure includes a packet output circuit configured to amplify a current for a packet and output the packet to a USB-compliant bus, a detection circuit configured to detect whether an amplitude level of the packet transmitted to the bus has exceeded a disconnection detection level for a prescribed time period, and a determination circuit configured to set a current for an EOP of an SOF packet output by the packet output circuit to lower than a current for a section other than the EOP, and when it is detected, by the detection circuit, that an amplitude level of the EOP has exceeded the disconnection detection level, determine that a device that was connected to the bus is disconnected.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The following describes a circuit device according to an embodiment with reference to the drawings. Note that, the size and scale of the components shown in the drawings are appropriately differentiated from the size and scale of the actual components. Also, the embodiments in the following description are favorable specific examples of the present disclosure and therefore various technically favorable limitations are imposed. However, the scope of the present disclosure is not limited thereto, unless limitations to the present disclosure are specifically mentioned in the following description.

Figure 1:
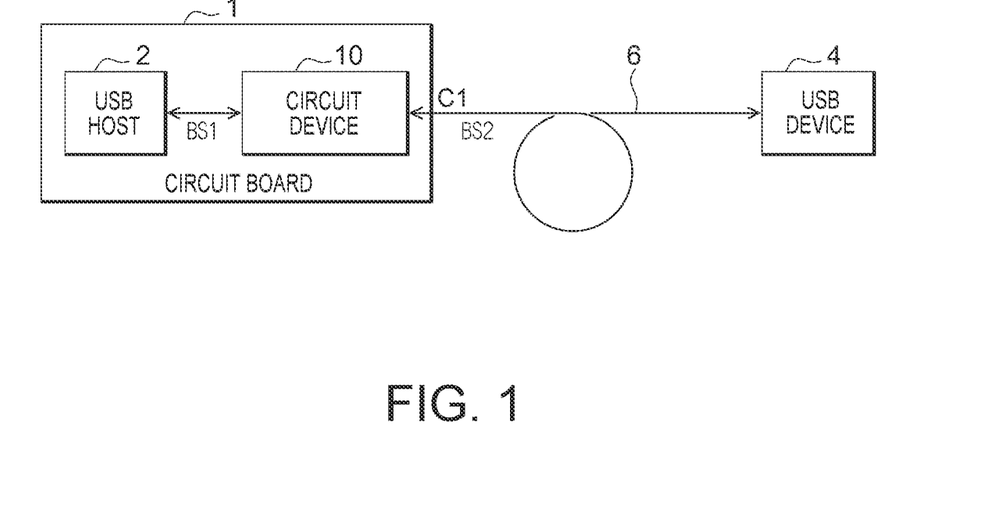
FIG. 1 is a diagram showing a connection between a circuit device according to an embodiment and other devices.

FIG. 1 is a diagram illustrating a connection of a circuit device 10 and the like according to an embodiment. As shown in FIG. 1, one end of the circuit device 10 is connected to a USB Host 2 via a bus BS1, and another end of the circuit device 10 is connected to a USB Device 4 via a bus BS2. Specifically, the USB Device 4 refers to a device, such as a memory card, a blue tooth (registered trademark) apparatus, and a DSRC (Dedicated Short Range Communications), that is controlled by a USB Host 2. The buses BS1 and BS2 are USB-compliant buses including signal lines of differential transmission signals DP, DM and the like.

When the USB Host 2 is an in-vehicle device such as a car navigation device, for example, a console in the vehicle is provided with a connector C1 connected to the other end of the circuit device 10, and the USB Device 4 is connected to the connector C1 via a USB cable 6.

When the USB cable 6 is comparatively short, a configuration is possible in which the USB Host 2 is connected to the USB Device 4 without passing through the circuit device 10. On the other hand, when the USB cable 6 is comparatively long, in the USB cable 6, a signal output from the USB Host 2 attenuates, and its waveform becomes blunt, and arrives at the USB Device 4. For this reason, the circuit device 10 provided between the USB Host 2 and the USB Device 4 performs resynchronization and amplification of the signal output from the USB Host 2 to compensate the attenuation and the like in the USB cable 6 in advance before outputting the signal.

Specifically, the USB Host 2 and the circuit device 10 are mounted on the circuit board 1, and the circuit device 10 and the connector C1 are connected, and the USB Device 4 is further connected to the connector C1 via the USB cable 6.

Figure 2:
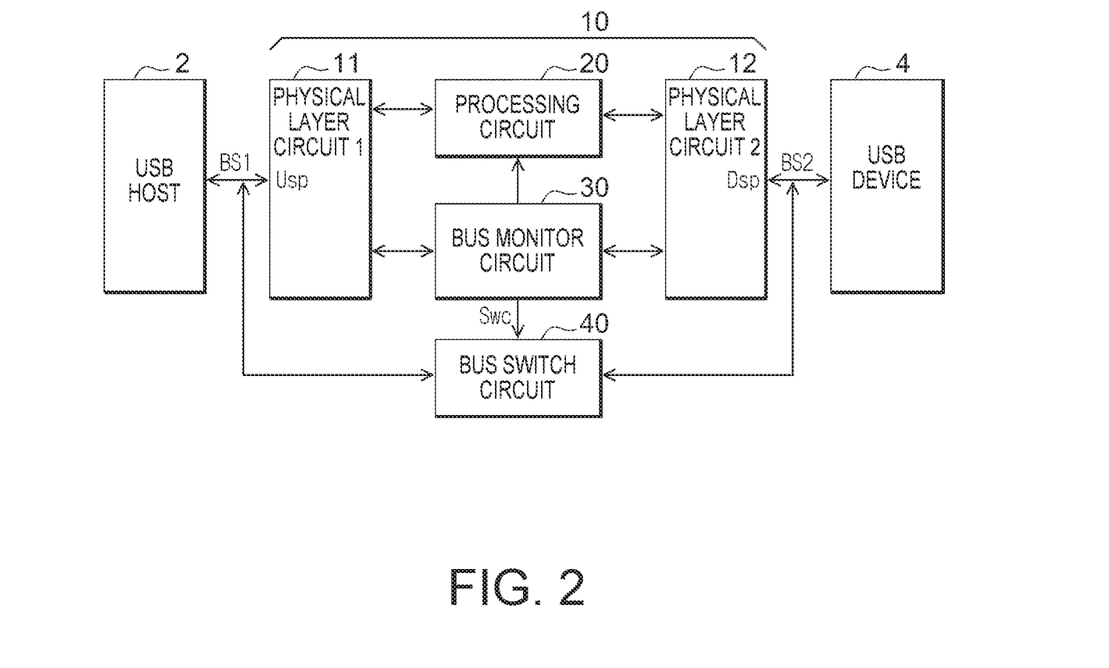
FIG. 2 is a diagram showing a configuration of a main part of the circuit device and a connection between the circuit device and the other devices.

FIG. 2 is a block diagram illustrating a schematic configuration of the circuit device 10. In FIG. 2, the circuit device 10 includes physical layer circuits 11, 12, a processing circuit 20, a bus monitor circuit 30, and a bus switch circuit 40.

Note that, in FIG. 2, "1" is given to the physical layer circuit 11 in order to distinguish the physical layer circuit 11 from the physical layer circuit 12. Similarly, "2" is given to the physical layer circuit 12 in order to distinguish the physical layer circuit 12 from the physical layer circuit 11.

The bus BS1 is connected to the physical layer circuit 11, and the bus BS2 is connected to the physical layer circuit 12. The physical layer circuits 11, 12 are constituted by analog circuits in a physical layer. The analog circuits in the physical layer include, for example, a transmission circuit, a reception circuit, various kinds of detection circuits, a pull-down resistor, and the like.

The bus monitor circuit 30 monitors the bus BS1 and the bus BS2, and outputs a signal Swc to the bus switch circuit 40 based on the monitoring result.

The bus switch circuit 40 turns on or off the connection between the bus BS1 and the bus BS2 in accordance with the signal Swc. Specifically, the bus switch circuit 40 turns on when the signal Swc is in an H level and turns off when the signal Swc is in an L level.

Also, the bus monitor circuit 30 determines an operation mode based on the result of monitoring the bus BS1 and the bus BS2. The operation mode includes an HS (High Speed) mode and an FS (Full Speed) mode compliant with the USB standard, and the bus monitor circuit 30 controls the various units in the determined operation mode.

Figure 4:
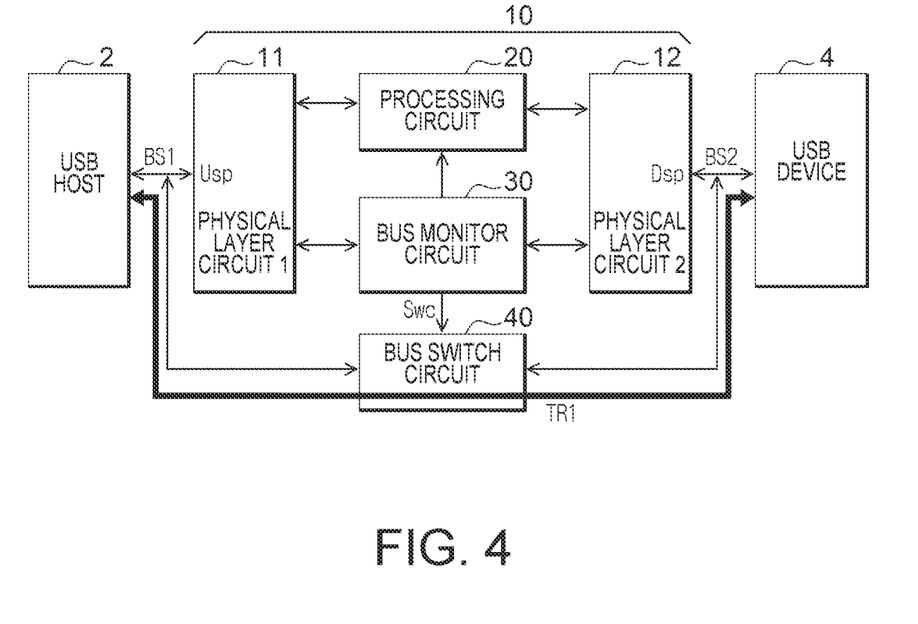
FIG. 4 is a diagram showing a transfer path between the circuit device and the other devices.

Note that, when it is determined that the HS mode cannot be set based on the result of monitoring the bus BS1 and the bus BS2, the bus monitor circuit 30 sets the signal Swc to the H level and turns on the bus switch circuit 40. When the bus switch circuit 40 is on, as shown in FIG. 4, packets and the like are transferred on a path TR1 that bypasses the processing circuit 20, between the USB Host 2 and the USB Device 4.

Figure 5:
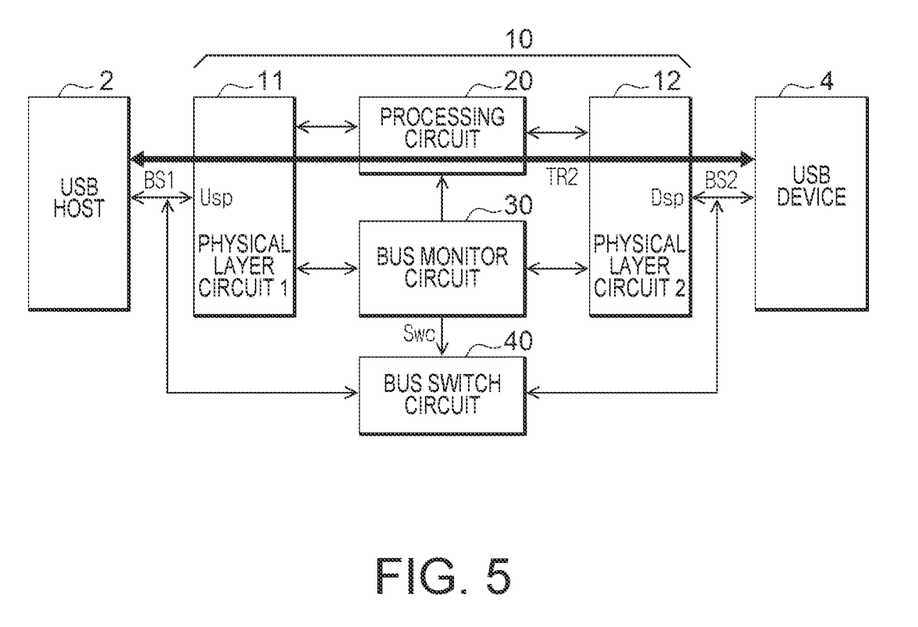
FIG. 5 is a diagram showing a transfer path between the circuit device and the other devices.

When it is determined that the HS mode can be set based on the result of monitoring the bus BS1 and the bus BS2, the bus monitor circuit 30 sets the signal Swc to the L level and turn off the bus switch circuit 40. When the bus switch circuit 40 is off, as shown in FIG. 5, packets and the like are transferred on a path TR2 that passes through the processing circuit 20, between the USB Host 2 and USB Device 4.

The processing circuit 20 is a circuit that executes various kinds of processing such as transfer processing in the HS mode. For example, in the HS mode, the processing circuit 20 transfers a packet received via the physical layer circuit 11 of the bus BS1 to the bus BS2 via the physical layer circuit 12, and transfers a packet received via the physical layer circuit 12 from the bus BS2 to the bus BS1 via the physical layer circuit 11. The processing circuit 20 also executes processing such as resynchronization of bits of a packet in the transfer described above. Furthermore, in the present embodiment, as will be described later, the processing circuit 20 designates a current value for outputting the resynchronized packet to the bus BS1 in the physical layer circuit 11, and designates a current value for outputting the resynchronized packet to the bus BS2 in the physical layer circuit 12.

Note that the processing circuit 20 executes transfer processing and the like without changing the format of the packet during a part or the entirety of the time period in which the bus switch circuit 40 is turned off.

The processing circuit 20 and the bus monitor circuit 30 are examples of the determination circuit. The processing circuit 20 and the bus monitor circuit 30 may be constituted integrally in a logic circuit such as a gate array, or may be constituted by a processor such as a CPU or an MPU.

Figure 3:
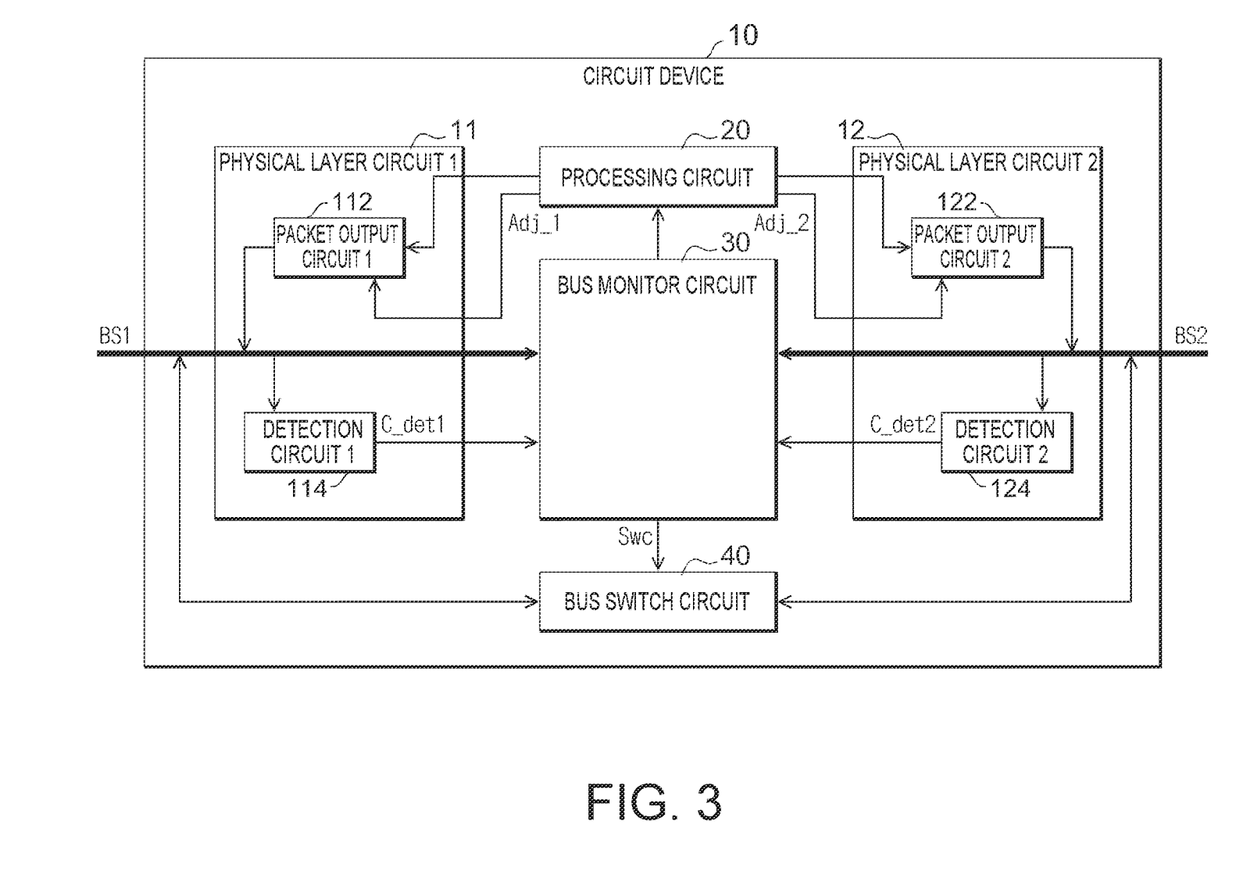
FIG. 3 is a diagram showing a configuration of the circuit device.

FIG. 3 is a diagram illustrating a configuration of the circuit device 10 in more detail. In FIG. 3, the physical layer circuit 11 includes a packet output circuit 112 and a detection circuit 114. Similarly to the physical layer circuit 11, the physical layer circuit 12 includes a packet output circuit 122 and a detection circuit 124.

Note that, in FIG. 3, "$_1$" is given to elements provided in the physical layer circuit 11 in order to distinguish the elements from elements provided in the physical layer circuit 12. Similarly, "2" is given to elements provided in the physical layer circuit 12 in order to distinguish the elements from the elements provided to the physical layer circuit 11.

In the HS mode, the packet output circuit 112 is used to output a packet supplied to the bus BS2 to the bus BS1 on the opposite side via the processing circuit 20. Specifically, in the HS mode, the packet supplied to the bus BS2 from the USB Device 4 is supplied to the packet output circuit 112 after being resynchronized by the processing circuit 20, and thus the packet output circuit 112 outputs the supplied packet to the bus BS1 with a current designated by the signal Adj_1.

Similarly, in the HS mode, the packet output circuit 122 is used to output a packet supplied to the bus BS1, to the bus BS2 on the opposite side via the processing circuit 20. In the HS mode, the packet supplied to the bus BS1 from the USB Host 2 is supplied to the packet output circuit 122 after being resynchronized by the processing circuit 20, and thus the packet output circuit 122 outputs the supplied packet to the bus BS2 with a current designated by the signal Adj_2.

Data transferred in compliance with the USB standard is constituted in units of "frames", and the "frames" are constituted by a plurality of "transactions" following a packet called an SOF (Start of Frame). "Transaction" is a unit with which transmission/reception of significant data is complete, and constituted by a plurality of packets. A packet is a minimum unit of data transferred in compliance with the USB standard, and can be categorized into several kinds including an SOF.

SYNC for performing synchronization is arranged at the head of a packet, and a PID (Packet Identifier) that indicates the kind of the packet is subsequently arranged. Whether a packet is an SOF or not is specified by the PID included in that packet. Also, an EOP (End of Packet) is arranged at the end of a packet that is an SOF. Note that a packet that is an SOF is hereinafter referred to as an SOF packet.

With USB, the USB Host 2 and the USB Device 4 are also provided with a similar physical layer circuit. The physical layer circuit of the device and the like is provided with a pull-down resistor. For example, when the USB Device 4 is disconnected, the pull-down resistor of the USB Device 4 is removed, and thus the signal amplitudes of the signals DP, DM increase with respect to the circuit device 10. Hereinafter, this will be illustrated with reference to FIGS. 18A and 18B.

Figure 18A:
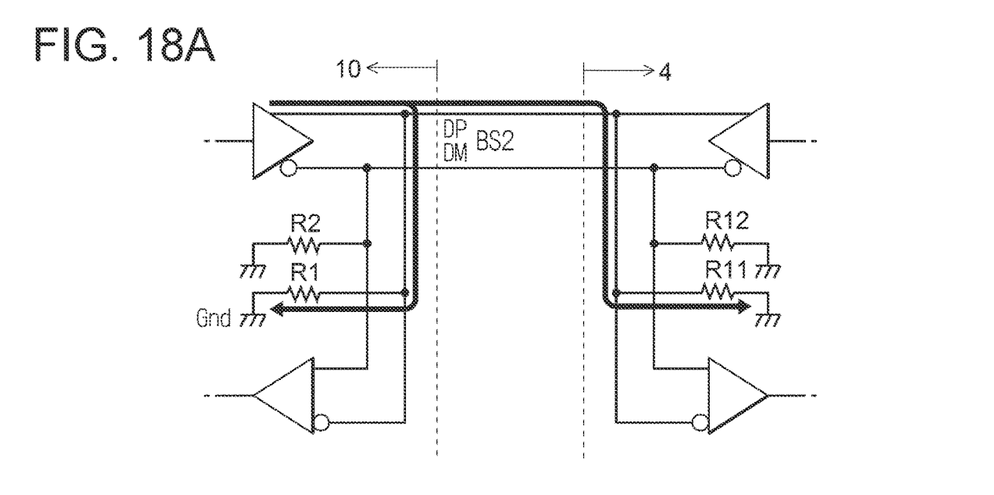
FIGS. 18A and 18B are diagrams illustrating device disconnection.
Figure 18B:
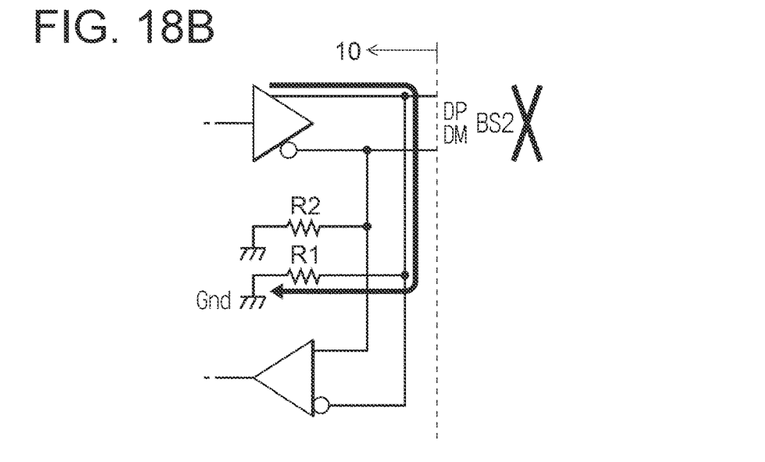

FIGS. 18A and 18B are diagrams illustrating a main part of the physical layer circuit 12 of the circuit device 10, and a main part of the physical layer circuit of the USB Device 4.

As shown in FIGS. 18A and 18B, the circuit device 10 includes a transmission circuit that transmits signals to the bus BS2 in a differential transmission, a reception circuit that receives the differential transmission signals from the bus BS2, a pull-down resistor R1 that is connected between the signal line of the differential transmission signal DP and a zero-voltage node Gnd, and a pull-down resistor R2 that is connected between the signal line of the differential transmission signal DM and the node Gnd. Note that the physical layer circuit of the USB Device 4 has a similar configuration, including a transmission circuit, a reception circuit, and pull-down resistors R11 and R12.

When the USB Device 4 is connected to the bus BS2 as shown in FIG. 18A, the transmission circuit of the circuit device 10 sends a constant current, as the signal DP, in a path as indicated by a bold line in FIG. 18A. In this case, the two pull-down resistors R1 and R11 are in parallel with each other in the DP signal line, and thus the sum value of the pull-down resistors is half the single resistance value of the pull-down resistor R1 or R11. This also applies to the DM signal line, and when the USB Device 4 is connected to the bus BS2, the sum value of the pull-down resistors is half the single resistance value of the pull-down resistor R2 or R12.

As shown in FIG. 18B, when the USB Device 4 is disconnected from the bus BS2, the transmission circuit of the circuit device 10 sends a constant current of the same value as in FIG. 18A, as the signal DP, on a path such as indicated by a bold line in FIG. 18B. In this case, since only the pull-down resistor R1 is connected to the DP signal line, the resistance value of the pull-down resistor is twice the value compared to when the USB Device 4 is connected thereto.

Accordingly, when the USB Device 4 is disconnected from the bus BS2, since the resistance value is doubled and the current value is the same, the amplitude level of the differential signal is twice the amplitude level of the differential signal in a state where the USB Device 4 is connected.

For this reason, a disconnection detection level serving as a threshold value is set between the amplitude level of the differential signal in a state where the USB Device 4 is connected and the amplitude level of the differential signal in a state where the USB Device 4 is disconnected, and when the amplitude level of the EOP of the SOF exceeds the disconnection detection level, it is possible to say that the USB Device 4 might have been disconnected.

Also, the reason why the amplitude level of the EOP of an SOF packet is compared with the disconnection detection level is because, in the EOP, the amplitude levels of the signals DP, DM that constitute the differential signal are fixed for a longer time than other packets, specifically 40 bits or approximately 83 nanoseconds, and held at the H level as the differential signal, and thus it is convenient for the comparison with the disconnection detection level.

Returning to FIG. 3, the detection circuit 114 detects whether the amplitude level of the HS packet transmitted to the bus BS1 has exceeded the disconnection detection level for a prescribed time period, and outputs a signal C_det1, which is the detection result, to notify the bus monitor circuit 30.

Similarly, the detection circuit 124 detects whether the amplitude level of the HS packet transmitted to the bus BS2 has exceeded the disconnection detection level for a prescribed time period, and outputs a signal C_det2, which is the detection result, to notify the bus monitor circuit 30.

Note that continuously for a prescribed time period means "on average for a prescribed time period", for example. Ideally, if the detection responses from the detection circuits 114 and 124 were sufficiently high, it would be possible to detect whether the amplitude level has exceeded the disconnection detection level for even a moment. However, in actuality, since such a high detection response from the detection circuits 114 and 124 cannot be expected in many cases, whether the average value of the amplitude level for a prescribed time period has exceeded the disconnection detection level is detected.

The disconnection detection level used to determine detection of disconnection is 525 mV, for example.

The bus monitor circuit 30 determines whether device disconnection has occurred based on the signals C_det1 and C_det2, as will be described later, and controls the processing circuit 20 and the bus switch circuit 40.

Note that, when it is determined that device disconnection has occurred, the bus monitor circuit 30 turns on the bus switch circuit 40 by setting the signal Swc to the H level, and switches the operation mode from the HS mode to the FS mode. Due to the bus switch circuit 40 being turned on, the path for the signals of packets and the like transferred between the USB Host 2 and the USB Device 4 switches from a path TR2 that passes through the processing circuit 20 to a path TR1 that passes through the bus switch circuit 40.

Figure 12:
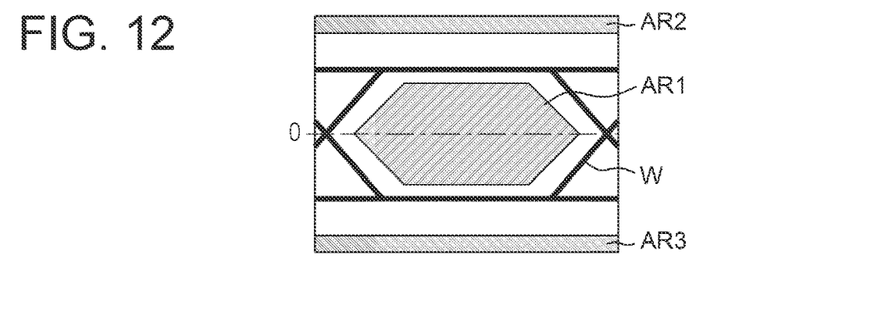
FIG. 12 is a diagram showing an eye pattern.

In the USB standard, when a signal is transmitted from one end of a USB cable, an eye-pattern measured at the other end of the USB cable is permitted to include a pattern called a "Far-End" which has a small opening such as shown in FIG. 12, with consideration for attenuation in the USB cable. Here, the eye-pattern refers to a waveform W indicated by superimposing a plurality of bits of the waveforms represented by the DP and DM signals that constitute a differential signal on each other. In the USB standard, it is sufficient that this waveform W does not overlap with prohibited regions AR1, AR2, and AR3.

Figure 13:
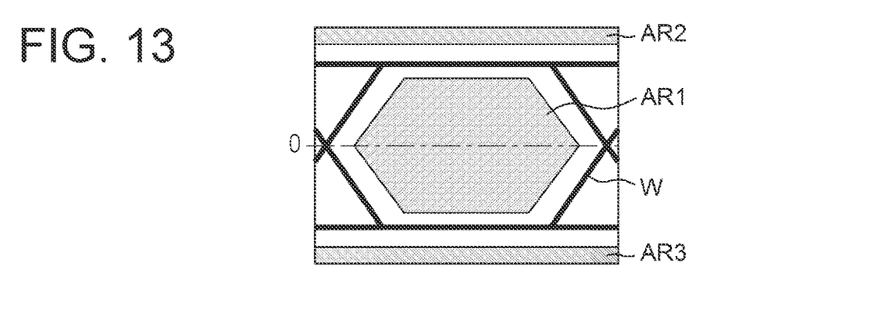
FIG. 13 is a diagram showing an eye pattern.

In recent years, the other end of the USB cable is required to include a pattern called a "Near-end" which has a large opening and has a high transfer quality such as shown in FIG. 13 in some cases. In order to satisfy the Near-End pattern, an amplitude of a signal transmitted from the one end of the USB cable is set large with consideration for attenuation in the USB cable.

However, it should be noted that, when the amplitude of the signal transmitted from the one end of the USB cable is too large, the disconnection detection level will be exceeded, which will lead to an erroneous determination that the USB Device 4 is disconnected, despite the USB Device 4 being connected.

In order to prevent such an erroneous determination, as described in the "Related art" section, there is a technique for increasing the disconnection detection level when the amplitude level of the signal is increased, however, with this technique, a configuration for changing the disconnection detection level is separately required, which tends to complicate the configuration.

In view of this, in the present embodiment, the bus monitor circuit 30 determines whether device disconnection has occurred in a manner described below.

Figure 6:
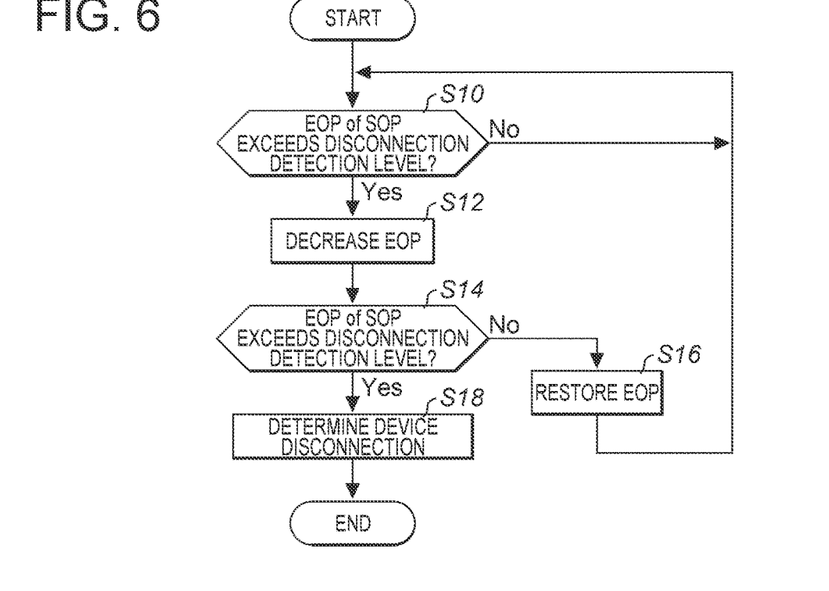
FIG. 6 is a flowchart showing an operation of the circuit device.

FIG. 6 is a flowchart showing an operation for determining device disconnection by the circuit device 10 according to the present embodiment, and FIGS. 7 to 11 are diagrams showing an amplitude level of a packet.

In the present embodiment, although it is possible to determine disconnection of devices connected to the bus BS1 and bus BS2, disconnection of the USB Device 4 connected to the bus BS2, out of the connections shown in FIG. 1, is taken as an example. As such, in the present embodiment, determination of whether the USB Device 4 is disconnected will be discussed.

Note that, since the bus switch circuit 40 is turned on in the FS mode, packets and the like are transferred between the USB Host 2 and the USB Device 4 on the path TR1 that bypasses the processing circuit 20. Accordingly, the operation of determining device disconnection is executed when packets and the like are transferred on the path TR2 that passes through the processing circuit 20, i.e., in the HS mode.

Furthermore, in FIGS. 7 to 11, of the packets output to the bus BS2, an SOF packet whose start is SYNC and whose end is EOP is illustrated for simplifying the description. The amplitude levels of the packets shown in the figures are indicated by absolute values at the signal DM or DP in a simplified manner. Note that, since the amplitude level of the sections of the packet other than EOP will be a level corresponding to "0" or "1", the levels are not actually continuous as indicated by the bold line, but are shown in a simplified manner in the figures.

First, when it is an SOF packet, the bus monitor circuit 30 determines whether the amplitude level of the EOP output to the bus BS2 has exceeded the disconnection detection level based on the signal C_det2 (step S10).

Figure 7:
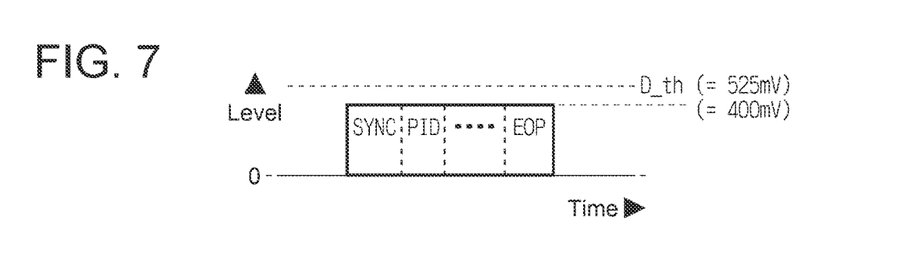
FIG. 7 is a diagram showing an amplitude level of a packet.

When the USB Device 4 is connected to the bus BS2, in principle, as shown in FIG. 7, the amplitude level of the EOP output to the bus BS2 is, for example, 400 mV, which is less than 525 mV that is the disconnection detection level D_th. Accordingly, the determination result of step S10 is "No", and the processing procedure returns to step S10 and loops again. Conversely, the bus monitor circuit 30 does not execute the following processing until the amplitude level of the EOP exceeds the disconnection detection level D_th.

Figure 8:
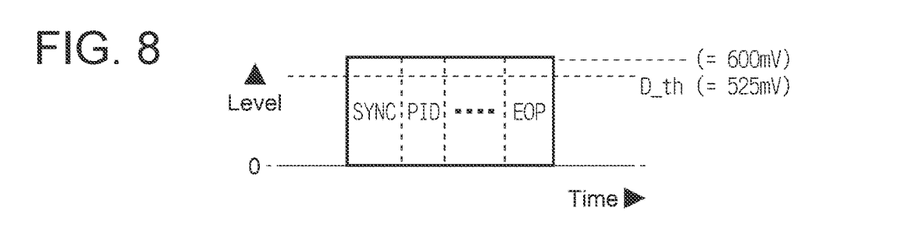
FIG. 8 is a diagram showing an amplitude level of a packet.
Figure 9:
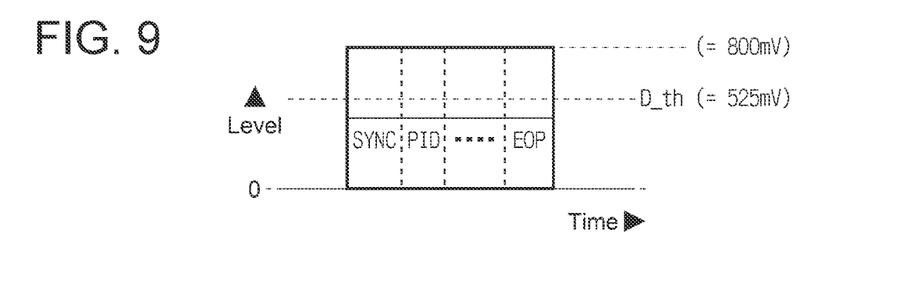
FIG. 9 is a diagram showing an amplitude level of a packet.

On the other hand, in step S10, when the amplitude level of the EOP output to the bus BS2 has exceeded the disconnection detection level D_th, the following two cases can be conceived. Specifically, the first case is an exception of the case in which the USB Device 4 is connected to the bus BS2, that is, the amplitude level of the EOP of the SOF packet output from the packet output circuit 122 in order to satisfy the Near-End pattern shown in FIG. 13 is, for example, 600 mV, and exceeds the disconnection detection level D_th as shown in FIG. 8. The second case is a case in which the USB Device 4 is disconnected from the bus BS2, and the amplitude level of the EOP of the SOF packet has exceeded the disconnection detection level as illustrated in FIG. 18B. Note that, in the second case, the amplitude level of the packet is twice the amplitude level of the case where the USB Device 4 is connected to the bus BS2 (see FIG. 7), and is, for example, 800 mV as shown in FIG. 9.

When the amplitude level of the EOP has exceeded the disconnection detection level D_th (when the determination result of step S10 is "Yes") due to being the first or second case, the bus monitor circuit 30 instructs the processing circuit 20 to decrease the level of the EOP of the SOF packet (step S12).

In response to this instruction, the processing circuit 20 determines whether the packet that follows the packet that has been determined in step S10 is an SOF, based on the PID, and if the packet is an SOF packet, the processing circuit 20 decreases the current value designated by the signal Adj_2 in the time period in which the EOP of the SOF packet is output, below a current value in a time period in which the sections other than the EOP are output, for example, to the minimum value. On the other hand, if the packet is an SOF packet, the processing circuit 20 does not change a current value designated by the signal Adj_2 in the time period in which the section of the SOF packet other than the EOP is output.

Figure 10:
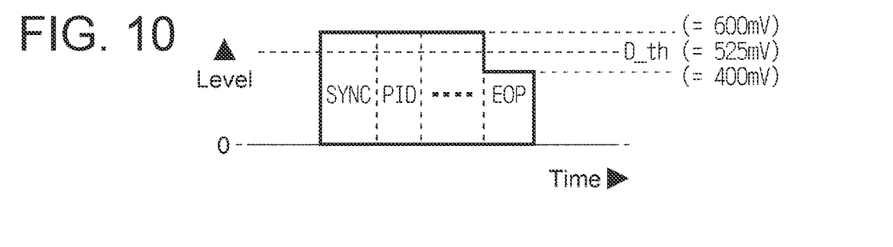
FIG. 10 is a diagram showing an amplitude level of a packet.

In the above-described first case, when the processing circuit 20 changes the current value designated by the signal Adj_2 in response to the instruction from the bus monitor circuit 30, in the SOF packet output from the packet output circuit 122, the amplitude level of only the EOP is decreased as shown in FIG. 10, and thus the amplitude level of the EOP becomes less than the disconnection detection level D_th. It should be noted that FIG. 10 shows an example in which the amplitude level of only the EOP of the SOF packet is decreased to 400 mV, and the amplitude level of the sections other than the EOP is kept at 600 mV.

Figure 11:
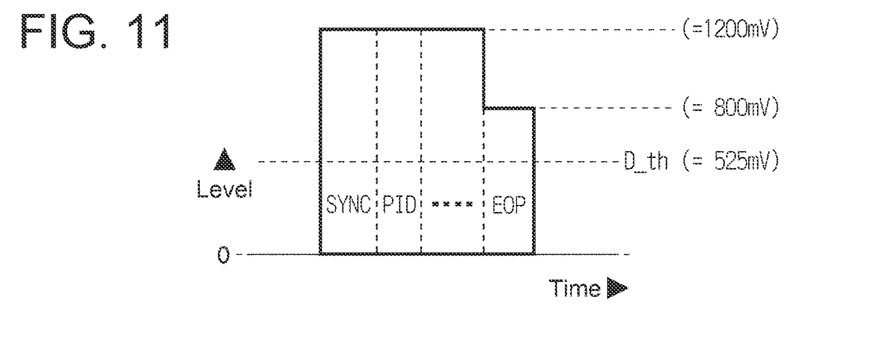
FIG. 11 is a diagram showing an amplitude level of a packet.

In the above-described second case, when the current value designated by the signal Adj_2 is changed in response to the above-described instruction, the amplitude level of the packet output by the packet output circuit 122 is doubled with respect to the amplitude level (see FIG. 10) in a case in which the USB Device 4 is connected to the bus BS2, and the amplitude level of the EOP exceeds the disconnection detection level D_th as shown in FIG. 11.

FIG. 11 shows an example in which the amplitude level of the EOP of the SOF packet is 800 mV, which is twice 400 mV, and the amplitude level of the sections other than the EOP is 1200 mV, which is twice 600 mV.

After giving an instruction to the processing circuit 20, the bus monitor circuit 30 determines again whether the amplitude level of the EOP of the SOF packet output to the bus BS2 has exceeded the disconnection detection level, based on the signal C_det2 (step S14).

When it is the first case, the amplitude level of the sections of the SOF packet other than the EOP is 600 mV as shown in FIG. 10, but since there is a bit change, the average value of the amplitude level does not exceed the disconnection detection level of 525 mV. Also, in this case, since the amplitude level of the EOP is decreased to 400 mV, even if the bits are fixed, the amplitude level will not exceed the disconnection detection level of 525 mV.

For this reason, when it is the first case, the determination result in step S14 is "No", and the bus monitor circuit 30 determines that device disconnection has not occurred.

According to this determination, the bus monitor circuit 30 notifies that device disconnection has not occurred to the processing circuit 20, and in response to the notification, the processing circuit 20 restores the current value that was decreased in a time period in which the EOP was output, to the original value (step S16). Thereafter, the processing procedure returns to step S10.

Note that, when the processing procedure returns to step S10, the amplitude level of the EOP of the SOF packet exceeds the disconnection detection level D_th, as shown in FIG. 8 for example, and the determination result in step S10 is "Yes". As a result, as long as the USB Device 4 is connected to the bus BS2, the processing procedure repeats the loop of steps S10, S12, S14, S16, and S10. Accordingly, even if the amplitude level of the EOP exceeds the disconnection detection level D_th in step S10, it is not determined that the device is disconnected.

On the other hand, when it is the second case, the amplitude level of the EOP of the SOF packet will be doubled to 800 mV due to the disconnection even if the current value is decreased, and thus the amplitude level exceeds the disconnection detection level D_th of 525 mV.

For this reason, when it is the second case, since the determination result in step S14 is "Yes", the bus monitor circuit 30 determines that device disconnection has occurred (step S18).

Note that, if the device disconnection is determined to have occurred, since the HS mode cannot be continued any longer, the bus monitor circuit 30 switches the operation mode to the FS mode.

According to the present embodiment, when the amplitude level of the packet is increased and the eye-pattern at the other end of the USB cable 6 is a high quality pattern with a large opening, it is possible to prevent an erroneous determination that device disconnection has occurred despite the USB Device 4 being connected. In particular, according to the present embodiment, since it is not necessary to change the disconnection detection level D_th used to determine device disconnection, and a circuit with a relatively lower detection response can be used for the detection circuit 124, it is possible to prevent the configuration from becoming complicated. Furthermore, in the present embodiment, since such an erroneous determination can be prevented, it is possible to prevent the HS mode between the USB Host 2 and the USB Device 4 from being interrupted.

Figure 14:
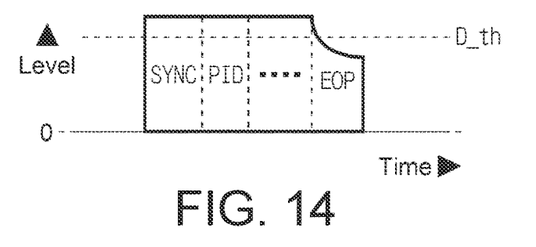
FIG. 14 is a diagram showing an amplitude level of a packet.

In the embodiment, the packet output circuit 122 has a configuration that outputs a packet at a current designated by the signal Adj_2, in other words, that output a packet after amplifying the current. In the current amplification, even an instruction is given by the signal adj_2 to decrease a current in a time period in which the EOP of the SOF packet is output (step S12), the waveform of the EOP that is actually output may not follow the instruction in some cases. Specifically, in response to the instruction in step S12, the amplitude level of the packet output from the packet output circuit 122 is ideally as indicated in FIG. 10, but in actuality, the amplitude level may become blunt at the start of the EOP as shown in FIG. 14.

In view of this, by taking the following measure, it is possible to remedy a case in which the amplitude level of the EOP becomes blunt at the start.

Figure 15:
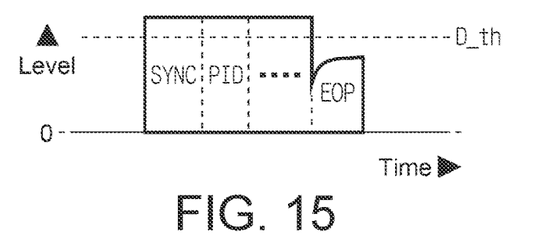
FIG. 15 is a diagram showing an amplitude level of a packet.

For example, the processing circuit 20 forcibly replaces at least the first 1 bit, i.e. the top bit, of the 40 bits constituting the EOP of the SOF packet, and sets the bit to an L level as a differential signal. As a result, the amplitude level at the start of the EOP excessively decreases as shown in FIG. 15, is offset by the bluntness in the packet output circuit 122, and can be approximated to the waveform of the amplitude level of the packet as shown in FIG. 10.

Note that, in the packet output circuit 122, when the extent of bluntness of the waveform at the start of the EOP is large, the bits of the 40 bits constituting the EOP from the second bit onward may be replaced in addition to the first bit.

Figure 16:
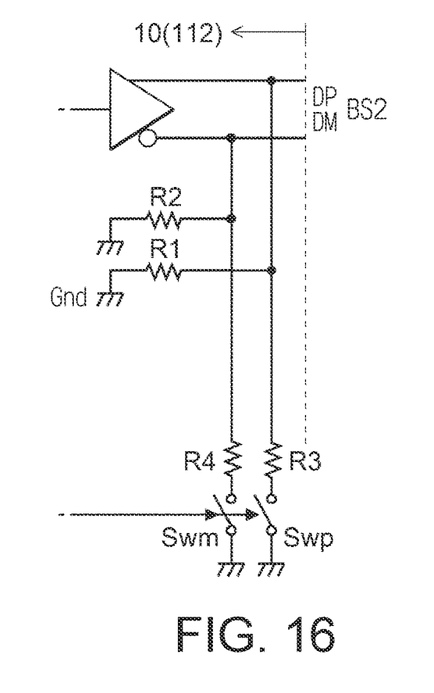
FIG. 16 is a diagram showing a main part of the circuit device.

Furthermore, as another measure to remedy a case where the amplitude level of the EOP of the SOF packet becoming blunt at the start, a configuration as shown in FIG. 16 may be used, in which a switch Swp for grounding the DP signal line to the node Gnd via the resistor R3, and a switch Swn for grounding the DM signal line via the resistor R4 are provided at the output end of the packet output circuit 122 in the physical layer circuit 12, for example. Specifically, the switches Swp and Swn are transistors, and are turned on for a period length corresponding to approximately 1 bit from the start of the EOP, for example. Turning on and off of the switches Swp and Swn is controlled by the processing circuit 20 that executes resynchronization of the packet, for example.

With this configuration, a current flowing in the DP signal line flows to the node Gnd by turning on the switch Swp, and a current flowing in the DM signal line flows to the node Gnd by turning on the switch Swm. For this reason, similar to the above-described case in which the top of the bits constituting the EOP is replaced, since the amplitude level at the start of the EOP excessively drops and is offset by the bluntness in the packet output circuit 122, it is possible to approximate the amplitude level of the packet to the amplitude level as shown in FIG. 10.

Since it is an object to forcibly cause a current to flow on the DP signal line, the connection destination of the switch Swp may be a current regulator circuit instead of grounding to the node Gnd. Similarly, the connection destination of the switch Swn may be a current regulator circuit instead of grounding to the node Gnd.

It should be noted that the switch Swp is an example of the first switch, and the switch Swm is an example of the second switch. The DP signal line is an example of the first signal line, the DM signal line is an example of the second signal line, and the node Gnd is an example of the ground node.

When the detection response from the detection circuit 124 is slow, in step S12, it is not necessary to instruct to decrease the current value for the entirety of the EOP of the SOF packet, and a configuration is possible in which decreasing the current value is instructed after a slight delay from the start of the EOP, to decrease the amplitude level of the EOP.

A configuration is possible in which the detection circuit 124 determines whether the amplitude level of the EOP of the SOF packet has exceeded the disconnection detection level D_th only in the time period in which the EOP is output. When the detection response is fast, there is a possibility that the detection circuit 124 detects that the amplitude level has exceeded the disconnection detection level D_th in a shorter period than the time period for calculating the above-described average value, for example, in a short period corresponding to the sections of the SOF packet other than the EOP. For this reason, a configuration is favorable in which the amplitude level in a time period other than the time period in which EOP of the SOF packet is output is not compared with the disconnection detection level D_th. Specifically, a configuration is favorable in which the detection circuit 124 masks the sections other than EOP in the SOF packet, and compares only the amplitude level of the entirety or part of the EOP with the disconnection detection level D_th.

Furthermore, in the embodiment, the bus monitor circuit 30 determines that device disconnection has occurred when both the determination results in steps S10 and S12 are "Yes", but the following determination is also possible.

When the packet output circuit 122 outputs a packet to the bus BS2 at a current designated by the signal Adj_2, whether the amplitude level of the packet exceeds the disconnection detection level D_th may be determined by a certain probability in some cases.

When the processing circuit 20 designates a current at which the amplitude level of the packet is highly likely to exceed the disconnection detection level D_th with the signal Adj_2, in the sections of the SOF packet other than the EOP, the packet is output from the packet output circuit 122 with the current designated by the signal Adj_2.

On the other hand, the processing circuit 20 decreases the current for the EOP of the SOF packet below the current designated for the sections of the SOF packet other than the EOP, and when the transmission of the EOP ends, restores the designated current to the original value.

A configuration is also possible in which the detection circuit 124 detects whether the amplitude level of the EOP of the SOF packet, for which the current has been decreased, has exceeded the disconnection detection level D_th, and when the signal C_det2 that indicates the detection result indicates that the disconnection detection level has been exceeded, the bus monitor circuit 30 determines that device disconnection has occurred.

With this configuration, it is possible to determine that device disconnection has occurred merely by detecting the amplitude level of the EOP of the SOF packet once.

Note that, although the embodiment assumes a connection state such as shown in FIG. 1, since the circuit device 10 is symmetric with respect to the processing circuit 20, the bus monitor circuit 30, and the bus switch circuit 40, it is also possible to connect the USB Host 2 to the bus BS2, connect the USB Device 4 to the bus BS1, and determine whether the USB Device 4 that was connected to the bus BS1 is disconnected.

Furthermore, in the embodiment, the function of outputting the packets by the packet output circuit 122, the function of detecting the amplitude level by the detection circuit 144, and the determination function of the bus monitor circuit 30 can be applied to a port other than the port of a relay device, for example as follows. Specifically, the above-described functions in the embodiment may also be applied to a downstream port of the USB Host 2, a downstream port of a hub for distributing packets received from an upstream device to one or more downstream devices, and the like.

Figure 17:
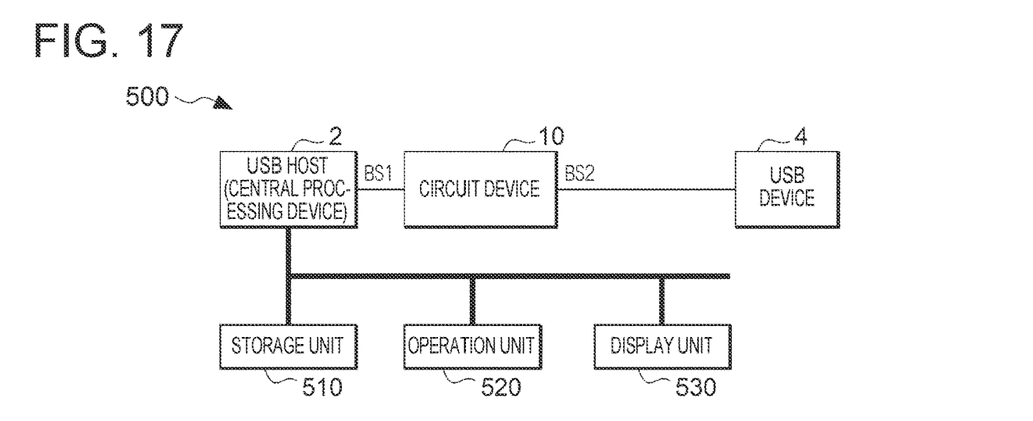
FIG. 17 is a diagram showing an example of an electric apparatus to which the circuit device according to the embodiment is applied.

FIG. 17 is a diagram showing an electronic apparatus 500 including the circuit device 10 according to an embodiment. This electronic apparatus 500 includes the circuit device 10 and the USB Host 2. The host device here is an example of a central processing device. The USB Host 2 is connected to the circuit device 10 via the bus BS1. Furthermore, the USB Device 4, for example, is connected to the circuit device 10 via the bus BS2.

The USB Host 2 may be realized by a processor such as a CPU, an MPU, or the like, or by a configuration in which one or more semiconductor integrated circuits, electric components, and the like are mounted.

The electronic apparatus 500 may further include a storage unit 510, an operation unit 520, and a display unit 530. The storage unit 510 stores data, and the function thereof is realized by a semiconductor memory, an HDD (Hard Disk Drive), or the like. The operation unit 520 is for the user to perform input operations, and is realized by operation devices such as operation buttons, a touch panel display, and the like. The display unit 530 displays various kinds of information, and is realized by a display such as a liquid crystal display or an organic EL panel. Note that, when a touch panel display is used for the operation unit 520, the touch panel display combines the functions of both the operation unit 520 and the display unit 530.

Various kinds of devices can be conceived as the electronic apparatus 500, such as an in-vehicle apparatus, a printing device, a projecting device, a robot, a head-mounted display device, a biological information measuring apparatus, a measuring apparatus for measuring a physical amount such as distance, time, current speed or flow rate, a network-related apparatus such as a base station or a router, a content providing apparatus for distributing contents, or a video apparatus such as a digital camera or a video camera.

What is claimed is:

1. A circuit device comprising:
   a packet output circuit configured to amplify a first current for a packet and output the packet to a USB bus;
   a detection circuit configured to detect whether an amplitude level of the packet transmitted to the USB bus has exceeded a disconnection detection level for a prescribed time period; and
   a determination circuit configured to set a second current for an EOP of an SOF packet output by the packet output circuit to lower than a third current for a section other than the EOP, and when it is detected, by the detection circuit, that an amplitude level of the EOP has exceeded the disconnection detection level, determine that a device that was connected to the USB bus is disconnected.

2. The circuit device according to claim 1, wherein
   when the second current for the EOP is decreased, the determination circuit replaces a top bit of the EOP with a bit that decreases the amplitude level.

3. The circuit device according to claim 1, wherein
   the packet output circuit includes:
   a first switch connected between a first signal line and a ground node, and
   a second switch connected between a second signal line and the ground node, and
   the first switch and the second switch turn on when a predetermined length of a time period has elapsed from a start of the EOP.

4. The circuit device according to claim 1, wherein
   the detection circuit compares the amplitude level of the EOP of the SOF packet with the disconnection detection level over an entirety or a part of a time period in which the EOP is output.

5. An electronic apparatus comprising:
   the circuit device according to claim 1; and
   a central processing device connected to the bus.

* * * * *